No. 721,528. PATENTED FEB. 24, 1903.
O. E. WALL.
RACK FOR HOLDING FALSE TEETH.
APPLICATION FILED DEC. 10, 1901.

NO MODEL.

WITNESSES:
Edward Thorpe
P. B. Owens

INVENTOR
Ormond E. Wall
BY
ATTORNEYS

UNITED STATES PATENT OFFICE.

ORMOND EDGAR WALL, OF HONOLULU, TERRITORY OF HAWAII.

RACK FOR HOLDING FALSE TEETH.

SPECIFICATION forming part of Letters Patent No. 721,528, dated February 24, 1903.

Application filed December 10, 1901. Serial No. 85,339. (No model.)

*To all whom it may concern:*

Be it known that I, ORMOND EDGAR WALL, a citizen of the United States, and a resident of Honolulu, Oahu, Territory of Hawaii, have invented a new and Improved Rack for Holding False Teeth, of which the following is a full, clear, and exact description.

The purpose of this invention is to provide a rack for holding false teeth which will serve also as an index to the dentist, enabling him to make the proper selection in any work that is being done and also showing him just what styles of teeth he needs to complete his stock. It is my purpose to make the rack in such shapes and sizes as occasion may require and also to arrange the compartments of the rack in such a manner that the rack may be used for the various sets of teeth—viz., for the sets of two, four, six, or a full upper set, (fourteen teeth,) or a full upper and lower set, (twenty-eight.) The drawings show a rack intended for sets of four teeth.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1:
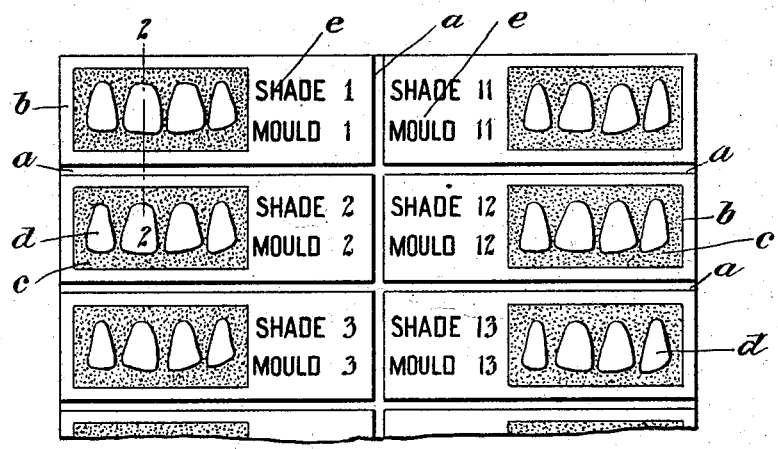
Figure 2:
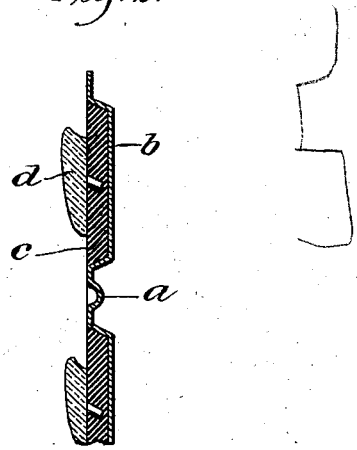

Figure 1 is a fragmentary front view of the rack, and Fig. 2 is a detail section on the line 2 2 of Fig. 1.

The rack may be formed of any material desired, preferably of sheet metal, and it is divided into a number of compartments by crossing indentations $a$, which serve the further purpose of strengthening the sheet metal of which the rack is formed. In each compartment of the rack is produced a depression $b$, occupying part of the compartment and filled with wax or like substance $c$. The teeth (indicated at $d$) are held to the rack by pressing the spurs of the teeth into the wax, as indicated in Fig. 2. This holds the teeth removably in place and at the same time exhibits them, so that they may be examined and the proper teeth selected at will. When one tooth is taken off, another tooth may be put on the rack to take its place. On the space at the side of each depression $b$ the rack is provided with characters (indicated at $e$) which recite the various characteristics of the teeth of the compartment to which they refer.

It is obvious that various alterations may be made in the form of the rack, so as to adapt it for holding sets of any number of teeth, without departing from the spirit of my invention.

Having thus described my invention, I claim as new and desire to secure by Letters Patent—

1. A tooth-rack for dental use, comprising a body with a compartment having an indentation formed therein and occupying part of its area, a plane surface being left at one side of the indentation for the purpose specified, and a substance in the depression for removably holding the teeth.

2. A tooth-rack for dental use, comprising a body portion divided into a number of compartments, each compartment having a depression formed therein, said depressions occupying part of the areas of the compartments, thus leaving a plane surface at one side of each depression, for the purpose specified, and means in the depression for removably holding the teeth.

3. A tooth-rack for dental use, comprising a body portion divided into a number of compartments, and a means in each compartment for removably holding the teeth, said means occupying part of the area of the compartment and leaving a plane surface at the side of said means, for the purpose specified.

4. A tooth-rack for dental use, comprising a body portion divided into a number of compartments, each compartment having a depression formed therein and said depressions occupying part of the areas of the compartments, thus leaving a space at one side of each depression for the purpose specified, and a wax-like substance placed permanently in each depression removably to hold the teeth.

5. A tooth-rack for dental use, comprising a body portion with crossing indentations dividing it into a number of compartments and each having a depression therein, said depressions occupying part of the areas of the compartments, thus leaving a space at one side of each depression, for the purpose specified, and means in the depressions for removably holding the teeth.

6. A tooth-rack for dental use, comprising a body portion with crossing indentations dividing it into a number of compartments and each having a depression therein, said depressions occupying part of the areas of the compartments, thus leaving a space at one side of each depression, for the purpose specified, and means in the depressions for removably holding the teeth, the said means for removably holding the teeth consisting in a wax-like substance in which parts of the teeth may be embedded.

In testimony whereof I have signed my name to this specification in the presence of two subscribing witnesses.

ORMOND EDGAR WALL.

Witnesses:
ROYAL D. MEAD,
A. LEWIS, Jr.